UNITED STATES PATENT OFFICE.

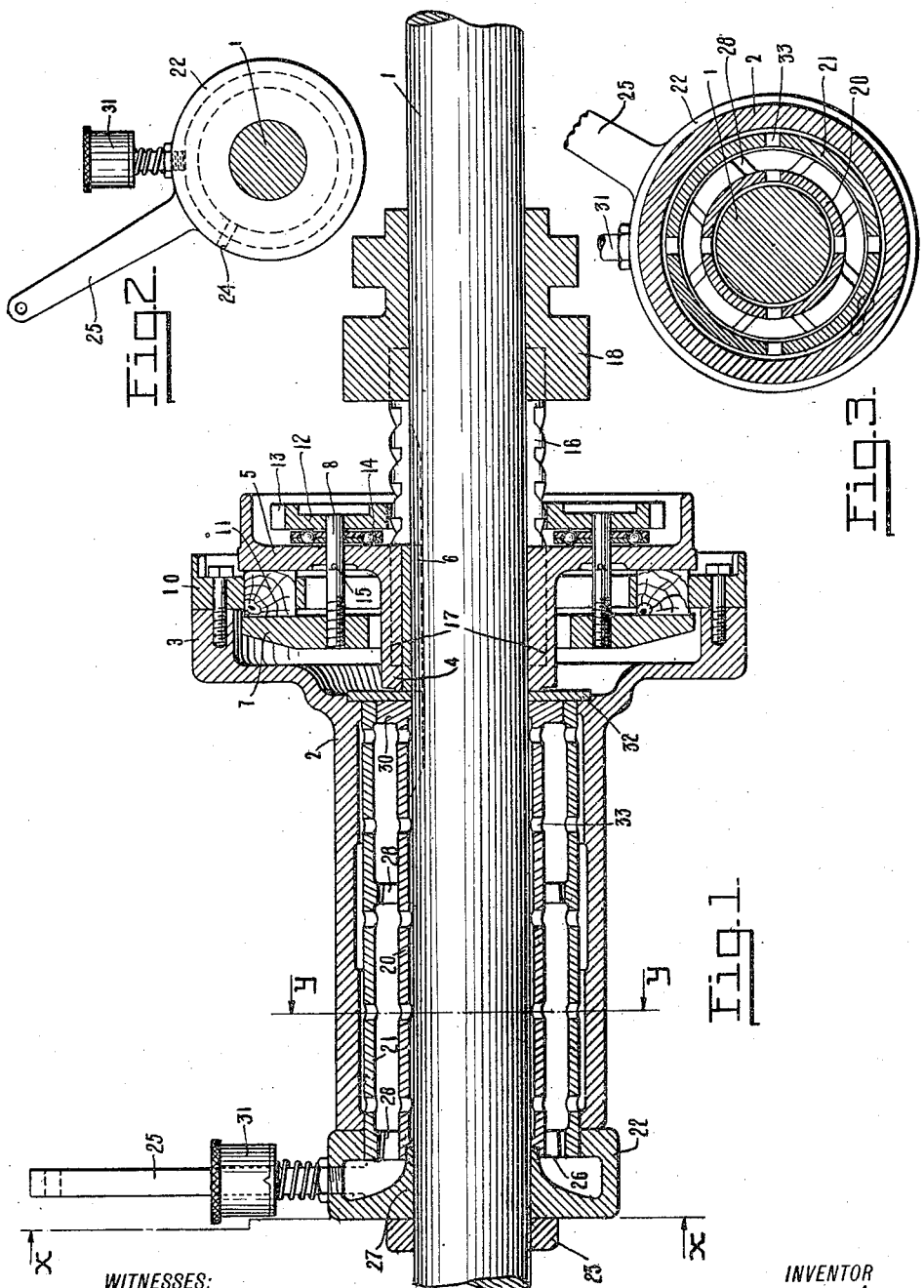

GILBERT J. SCOFIELD, OF ELMIRA, NEW YORK, ASSIGNOR TO THE HILLIARD CLUTCH & MACHINERY CO., OF ELMIRA, NEW YORK, A CORPORATION OF NEW YORK.

POWER-TRANSMISSION MECHANISM.

1,130,341.      Specification of Letters Patent.      Patented Mar. 2, 1915.

Application filed May 6, 1913. Serial No. 765,739.

*To all whom it may concern:*

Be it known that I, GILBERT J. SCOFIELD, a citizen of the United States, residing at Elmira, in the county of Chemung and State of New York, have invented certain new and useful Improvements in Power-Transmission Mechanism, of which the following is a full, clear, and exact description, such as will enable others skilled in the art to which it appertains to make and use the same.

This invention relates to power transmission mechanism, and, with regard to certain more specific features thereof, to mechanism adapted to connect and disconnect driving and driven members.

One of the objects of the present invention is to provide a practical and simple form of power transmission mechanism between a driving and a driven member.

Another object is to provide a mechanism of the above general character in which all driving tendency of the driving member upon the driven member is eliminated upon the normal connection being broken.

Another object is to provide mechanism of the last above mentioned character in which the load may act upon the driven member and immediately bring the same to rest independently of the movement of the driving member.

A further object is to provide a power transmission mechanism which will be cheap to manufacture and easy to assemble.

A further object is to provide mechanism of the last above mentioned character which may be easily applied to apparatus already in use and may be used irrespective of the positions of the driving and driven members.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, wherein is shown one of the various possible embodiments of this invention, Figure 1 is a longitudinal sectional view of the complete device; and Figs. 2 and 3 are detail sectional views taken on the lines $x$—$x$ and $y$—$y$ of Fig. 1 looking in the directions of the arrows.

Similar reference characters refer to similar parts throughout the various views of the drawing.

The present device, which includes a clutch mechanism of any desired type, is particularly adapted for situations in which a quick stop of the machine or driven member is required, as in drilling and punching machines, for example, and, for the sake of clearness in describing the invention, a main central shaft 1 will hereinafter be referred to as the driving shaft or driving member, while the outer shell 2, upon which a pulley (not herein shown) may be secured, will be hereinafter referred to as the driven member, although it is, of course, to be understood that the direction of power transmission may be reversed without affecting the spirit of the invention and the appended claims are to be interpreted accordingly.

As shown clearly in Fig. 1, a clutch mechanism of any desired type is mounted directly upon the driving shaft 1 and is adapted to be operatively connected with a flange 3 of the driven member. The clutch as herein shown comprises a hub 4 with an outwardly projecting flange 5 keyed at 6 to the shaft 1 and adapted to turn therewith. About the hub 4 and parallel to the flange is a backing ring 7 held in a substantially concentric position by means of a plurality of rotatable bolts 8 passing loosely through the flange 5 and threaded into the backing ring. Intermediate the flange and backing ring is an annular friction disk 10 secured or bolted to the flange 3 of the driven member in a manner to prevent relative rotation. This intermediate friction disk 10 is provided with a plurality of transverse openings in which are positioned blocks of fibrous material 11 having a high co-efficient of friction and preferably of a non-combustible nature. Each of the bolts 8 connecting the flange 5 and backing ring 7 is provided with a head 12 in the form of a spiral gear or a gear provided with a plurality of sharply inclined teeth 13 about its periphery. A thrust bearing 14 of any desired type is interposed between the adjacent sides of the gear and the flange 5 of the hub, thereby to permit a free turning movement thereof. Longitudinal movement of these bolts 8 is prevented by pins 15. Each gear is adapted to mesh with a longitudinally reciprocating rack 16, having correspondingly inclined teeth adapted to move longitudinally with respect to the shaft in and out of holes 17 bored in the hub shown in dotted lines as a trunnion ring 18 is moved. This trunnion ring is adapted to be connected with a clutch operating lever (not herein shown) in any well known manner. This clutch mechanism as above described is substantially the same as the clutch shown in the patent to W. J. Hilliard, No. 872,062, patented November 26, 1907, and forms no specific part of my present invention, except in so far as it enters into the combination hereinafter more fully described and set forth in the appended claims.

The shell 2, on which the driving pulley is adapted to be mounted, is spaced relatively to the shaft and is provided with a bushing therebetween. This bushing comprises two substantially concentric cylindrical members, one 20, fitted relatively close to the driving shaft 1, and the other 21, relatively close to the driven member 2 and providing a slight space therebetween. One end of the outer cylindrical member is adapted to be pressed into the open end of a hollow casting 22 surrounding the driving shaft and held against longitudinal movement by means of a collar 23 clamped to the shaft. A pin 24 passing through the casting and cylindrical member further prevents relative rotation of these parts. This casting is provided with a laterally extending arm 25 of any desired length adapted to be secured to a permanently fixed object, such as the frame of the machine, thereby to prevent rotation thereof about the driving shaft. The corresponding end of the inner cylindrical member or sleeve is provided with a lip 26 which is pressed over a central annular projection 27 of the hollow casting. Spacing lugs 28 are provided at this end of the inner cylindrical member, as well as the central part thereof, coacting with the outer cylindrical member to hold the parts in proper spaced position. The opposite end is provided with a solid upturned flange 30 forming a supporting surface and adapted to prevent lubricant, which is fed from a grease-cup 31 of any desired type through the curved interior of the casting, from entering the clutch mechanism. As an extra precaution, but more especially to prevent motion being transmitted from the hub 4 to the inner sleeve 20 by frictional contact, there is provided a flat annular ring 32 therebetween. At regular intervals, holes 33 are bored in both of the cylindrical members to permit the lubricating fluid to pass between the adjacent surfaces of the driving and driven members and the respective adjacent sleeves. It will thus be seen that motion of the driving member cannot be transmitted to the driven member when the clutch is thrown out by friction of the parts due to the interposed bearing. The cylindrical members, which are pressed into the stationary casting and on which the driven member is adapted to turn, positively arrest any motion which might otherwise be transmitted from the driving shaft through the cylindrical members.

The operation of this device is substantially as follows:—When the trunnion ring 18 is moved toward the left (Fig. 1), the rack members 16 coact with the gears 12 to cause a rotation thereof and a corresponding rotation of the threaded portions of the bolts 8 to draw the flange and backing ring toward each other, thus firmly clamping the friction blocks 11 carried by the intermediate friction disk on the driven member therebetween. Power is thus transmitted through the driving shaft to the driven member or shell 2 upon which the pulley is mounted. An opposite movement of the trunnion ring will throw out the clutch, and the load on the driven pulley will instantly arrest its turning movement. The continued rotation of the shaft will have no effect upon the driven member, for the reason that any friction which may exist will be taken up by the inner cylindrical member 20, secured to the casting 22, thus absolutely doing away with friction between the member and line shaft.

From the above description, it will be clear that the device may be easily applied to apparatus already in use and may be used irrespective of the positions of the driving and driven members.

The device is simple and practical in construction, cheaply made and easily assembled, and is believed to accomplish, among others, all of the objects and advantages above set forth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In power transmission mechanism, in combination, a driving member, a driven member, means for connecting and disconnecting said members at will, a stationary member positioned between the driving and driven members adapted to prevent motion being transmitted from one to the other by friction, said stationary member comprising two concentric cylindrical sleeves having a space therebetween for the admission of lubricant to the adjacent surfaces of said members, and means whereby the lubricant may be distributed to the inner and outer surfaces of the stationary member.

2. In power transmission mechanism, in combination, a driving member, a driven member, means for connecting and disconnecting said members at will, and a stationary member positioned between the driving and driven members adapted to prevent motion being transmitted from one to the other by friction, said stationary member comprising two concentric cylindrical sleeves, and a hollow annular lubricant chamber closely fitting said driving member and discharging between said sleeves, into which one of said cylindrical sleeves is adapted to be pressed.

3. In power transmission mechanism, in combination, a driving member, a driven member, and a stationary bushing therebetween, said bushing comprising two perforated cylindrical sleeves spaced apart and held against rotation.

4. In power transmission mechanism, in combination, a driving member, a driven member, and a bushing therebetween, said bushing comprising two cylindrical sleeves one within the other, the outer sleeve being held against movement, and a space provided between said sleeves for the admission of lubricant to all relatively movable adjacent surfaces.

5. In power transmission mechanism, in combination, a driving member, a driven member, and a bushing therebetween, said bushing comprising two substantially concentric perforated cylinders having a space therebetween, means holding said cylinders against rotation, and spacing lugs on one of said cylinders adapted to hold the other in proper position with respect thereto.

6. In power transmission mechanism, in combination, a driving member, a driven member, and a bushing therebetween, said bushing comprising two perforated cylinders having a space therebetween, means holding said cylinders against rotation, spacing lugs on one of said cylinders adapted to hold the other in proper position with respect thereto, and means for supplying lubricant to the space between the cylindrical members whereby lubricant may flow through the perforations to lubricate the adjacent relatively movable surfaces.

7. In power transmission mechanism, in combination, a driving member, a driven member, a transmission device comprising a friction member carried by said driving member and a friction member carried by said driven member, means adapted to cause engagement of said members to drive said driven member, means adapted positively to disengage said members, and a stationary bushing between said driving and said driven member adapted to relieve any tendency for the driven member to be moved by the driving member.

8. In power transmission mechanism, in combination, a driving member, a driven member, a transmission device comprising frictional means on said driving member and frictional means on said driven member, means adapted to positively disengage said frictional means to relieve further tendency of the driving member to move the driven member, and a stationary bearing bushing between said members adapted to relieve any tendency of the driving member to move the driven member.

9. In power transmission mechanism, in combination, a driving member, a driven member, a transmission device comprising frictional means on said driving member and frictional means on said driven member, means adapted to positively disengage said frictional means to relieve further tendency of the driving member to move the driven member, and a stationary bearing bushing between said members adapted to relieve any tendency of the driving member to move the driven member, said bushing comprising means adapted to supply lubricant between said driving member and said bushing and said driven member and said bushing.

10. In power transmitting mechanism, in combination, a shaft, a pulley support mounted thereon, a clutch adapted to be actuated at will for connecting and disconnecting said parts, and means between the shaft and pulley support adapted to prevent momentum of one member being transmitted to the other by friction when the clutch is disconnected, said means comprising an annular part surrounding the driven shaft, a sleeve loosely mounted on the shaft and coacting with said part, and a second sleeve surrounding and having a portion spaced apart from the first mentioned sleeve, said pulley support being mounted upon said second mentioned sleeve.

11. In power transmitting mechanism, in combination, a shaft, a pulley support mounted thereon, a clutch adapted to be actuated at will for connecting and disconnecting said parts, and means between the shaft and pulley support adapted to prevent momentum of one member being transmitted to the other by friction when the clutch is disconnected, said means comprising an annular part surrounding the shaft, a sleeve mounted on the shaft and coacting with said part, and a second sleeve surrounding the first mentioned sleeve and spaced apart therefrom, said pulley support being mounted upon said second mentioned sleeve, one of said sleeves being provided with a flange for closing the space between the sleeves at one end thereof.

12. In power transmitting mechanism, in combination, a shaft, a pulley support mounted thereon, a clutch adapted to be actuated at will for connecting and disconnecting said parts, and means between the shaft and pulley support adapted to prevent momentum of one member being transmitted to the other by friction when the clutch is disconnected, said means comprising an annular stationary part surrounding the shaft, a sleeve mounted on the shaft and coacting therewith, and a second sleeve surrounding the first mentioned sleeve, said pulley support being loosely mounted upon said second mentioned sleeve, one of said sleeves being provided with a plurality of spacing means adapted to hold the sleeves in spaced relation.

13. In power transmitting mechanism, in combination, a shaft, a pulley support mounted thereon, a clutch adapted to be actuated at will for connecting and disconnecting said parts, means between the shaft and pulley support adapted to prevent momentum of one member being transmitted to the other by friction when the clutch is disconnected, said means comprising an annular hollow stationary part surrounding the shaft, a sleeve mounted on the shaft and coacting with said annular part, a second sleeve surrounding the first mentioned sleeve and secured to said annular part, said pulley support being mounted directly upon said second mentioned sleeve, one of said sleeves being provided with a plurality of spacing means adapted to hold the sleeves in spaced relation, and means for admitting lubricant to the space between said sleeves through said hollow part whereby the adjacent relatively movable surfaces may be lubricated.

14. In power transmitting mechanism, in combination, a shaft, a member mounted thereon in axial alinement, a friction clutch for connecting and disconnecting the parts at will, and a stationary bushing positioned between the shaft and member, said bushing comprising two concentric cylindrical perforated sleeves spaced apart one from the other, a plurality of spacing means for holding the said sleeves in their spaced relation, a relatively stationary part to which said sleeves are adapted to be secured, and means for admitting lubricant to the space between said sleeves whereby it may flow through the perforations to lubricate all of the adjacent relatively movable surfaces.

In testimony whereof I affix my signature, in the presence of two witnesses.

GILBERT J. SCOFIELD.

Witnesses:
A. M. BOVIER,
F. E. FISK.

Copies of this patent may be obtained for five cents each, by addressing the "Commissioner of Patents, Washington, D. C."